March 13, 1928.
O. BURKHARDT
STONE SAW
Filed July 13, 1923
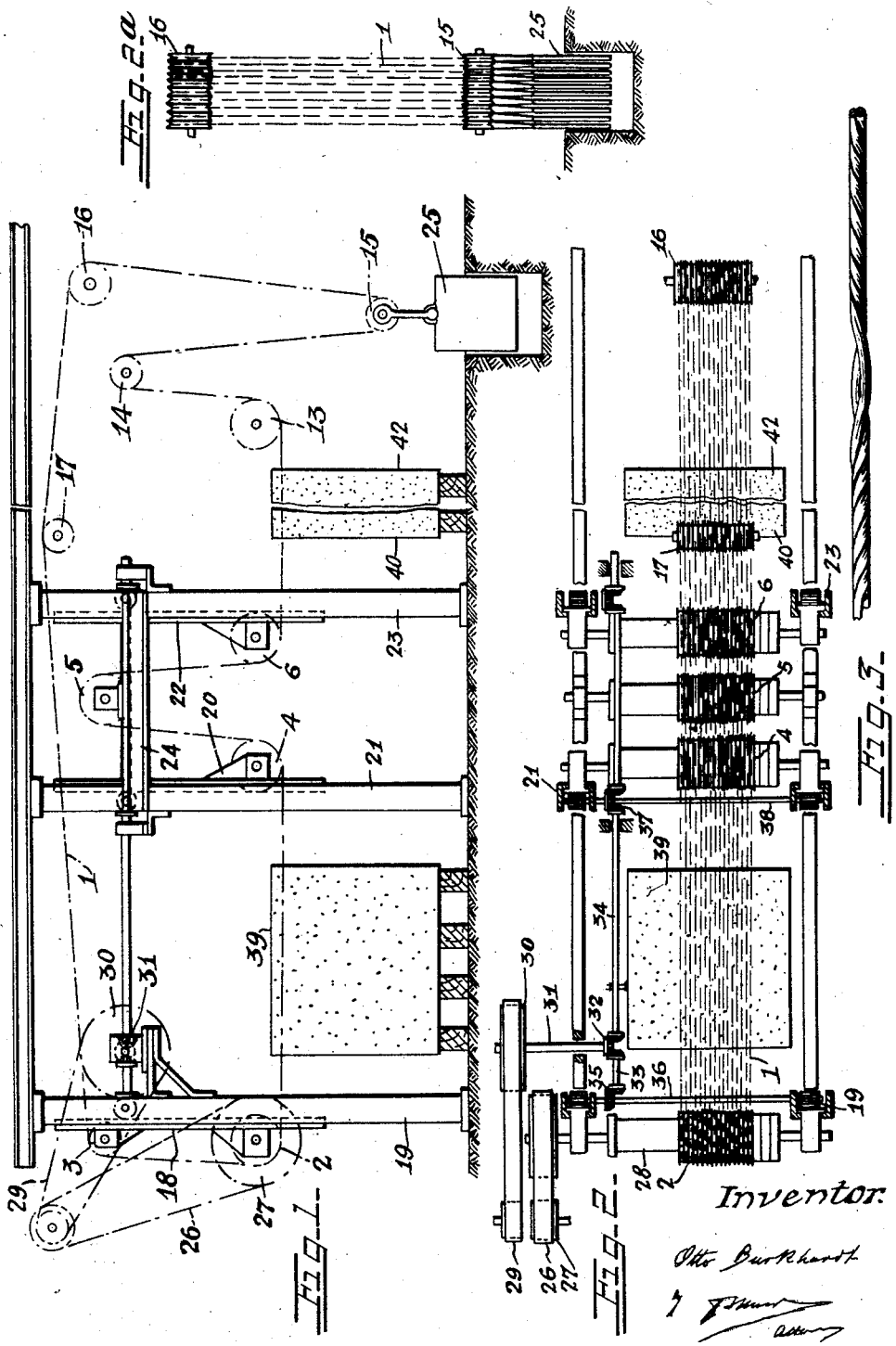
Inventor
Otto Burkhardt Patented Mar. 13, 1928.

1,662,483

UNITED STATES PATENT OFFICE.

OTTO BURKHARDT, OF BAYREUTH, GERMANY.

STONE SAW.

Application filed July 13, 1923, Serial No. 651,424, and in Germany May 26, 1923.

This invention relates to a stone saw the cutting tool of which consists of several juxtaposed endless wire ropes.

Stone saws having several wire ropes arranged the one at the side of the other to cut successively several works are known per se. From stone saws of this type the stone saw improved according to this invention differs in that every wire rope is stretched for itself and the cutting side of each endless wire rope is held between the several works by guide pulleys adapted to be adjusted in vertical direction. If every endless wire rope is not stretched for itself it is impossible to ensure a uniform stretching of all the wire ropes by one stretching device as no wire rope corresponds with another wire rope accurately as regards length and expanding capability, so that the one rope would be slacker than the other and the wire ropes would never be able to cut uniformly. If every wire rope is not gripped by a guide pulley between every two works, as is the case according to the invention, the cutting side of the wire rope would yield in a large upwardly curved arc, so that it would work uneconomically or even not at all.

The invention will be best understood from a consideration of the following detailed description taken in connection with the accompanying drawing forming part of this specification, with the understanding that while on the drawings one embodiment of the invention is diagrammatically shown, the invention is not confined to any strict conformity with the showing of the drawings, but may be embodied in any manner which does not make a material departure from the salient features of the invention.

An embodiment of the invention is shown, by way of example, in the accompanying drawing in which:

Fig. 1 shows the improved stone saw in side elevation, partly broken away.

Fig. 2 is a top plan view of Fig. 1.

Fig. 2ª shows in elevation the end of the cable loaded with heavy masses.

Fig. 3 shows a portion of the cable.

Each endless wire rope 1 is guided over sixteen guide pulleys 2—17 of which ten are shown. The guide pulleys 2, 3 are arranged the one above the other in a carriage 18 mounted upon a stationary column 19 so that it may be displaced in vertical direction. The guide pulley 3 may however be mounted also stationary or so that it may be displaced independently of the pulley 2. The guide pulley 4 is mounted in a carriage 20 which is arranged on a stationary column 21 so that it may be displaced in vertical direction.

The endless wire rope 1 starts from the guide pulley 4 over the guide pulley 5 to the guide pulley 6 which is mounted in a carriage 22 movable in vertical direction on the column 23. The guide pulley 5 is mounted on a longitudinal beam 24 fixed to the two stationary columns 21 and 23. The endless wire rope 1 is further guided over the guide pulleys 13 and 14 and pulleys not shown arranged similarly to 4, 5 and 6. The guide pulley 13 is mounted in a similar manner as the guide pulleys 2, 4 and 6 in a carriage adapted to be displaced in vertical direction, the mounting of the guide pulley 14 being similar to that of guide pulleys 3 and 5. From the guide pulley 14 the wire rope 1 is conducted over the guide pulley 15 to which a counterweight 25 (one for each rope) is attached and which serves as a stretching device, said wire rope going from the guide pulley 15 over the guide pulleys 16 and 17 back to the pulley 3.

For each of the juxtaposed endless wire ropes a set of guide pulleys 2 to 17 is arranged. The drive is transmitted from any convenient source of energy by a belt 26 and belt pulley 27 to a shaft 28 on which all the pulleys 2 are keyed the one at the side of the other. The pulleys 4, 6 and 13 are also mounted on common shafts, on which they may be keyed or loosely mounted so as to rotate independently of one anther. The other guide pulleys are revoluble independently from one another.

The vertical displacement of the carriages is controlled by the same source of energy by means of a belt 29 and belt pulley 30. The shaft 31 of the belt pulley operates through the intermediary of a bevel wheel gear 32 two shafts 33, 34 standing perpendicular to said shaft 31, the shaft 33 driving through a bevel pinion 35 a shaft 36 and the shaft 34 driving by a bevel pinion 37 a shaft 38. The carriages 2 and 4 are lowered and raised from the shafts 36 and 38 in the well known manner by means of toothed wheel and rack drive on the column 19 or the like. In alignment with the shafts 33 and 34 other shafts are arranged which operate each through the intermediary of bevel wheel gears transverse shafts designed to control the vertical displacement of the other carriages.

Between the guide pulleys 2 and 4, 6 and 13 and between the similar set of pulleys not shown the working pieces 39, 40, 42 are arranged. Each endless wire rope 1 cuts therefore between the guide pulleys mentioned, each work being cut by the juxtaposed wire ropes. With the stone saw according to the invention a great amount of work can be executed. The adjusting of the wire ropes in accordance with the progress of the sawing is effected by displacement of the guide pulleys 2, 4, 6, and 13 mounted in carriages adjustable in vertical directions, the adjusting being effected through the intermediary of the above described drive and of the stretching weight. The stone saw may however be constructed in such a manner that only a single work or more than four works at a time can be cut by the juxtaposed wire ropes.

I claim:—

A stone saw comprising in combination several wire ropes arranged the one at the side of the others, a supporting frame for these wire ropes said supporting frame comprising a number of successive working points for each rope, a set of guide pulleys in front of each working point, and a set of guide pulleys behind each working point, the lower pulley of each set of pulleys serving to guide the cutting side of the wire rope with regard to the work and the upper guide pulley of each set of pulleys serving to conduct the wire rope from the one cutting plane into the next following cutting plane, and means for stretching each wire rope independently of the other wire ropes.

In testimony whereof I affix my signature.

OTTO BURKHARDT.